US012537122B2

(12) United States Patent
Eliason et al.

(10) Patent No.: US 12,537,122 B2
(45) Date of Patent: Jan. 27, 2026

(54) DETACHABLE MAGNETIC MOUNTING SYSTEMS, DEVICES AND METHODS

(71) Applicant: Magnetic Mechanisms L.L.C., Shoreview, MN (US)

(72) Inventors: Jeffery M. Eliason, Shoreview, MN (US); Mitchell Porch, Grand Rapids, MI (US); Joseph Funk, St. Paul, MN (US); Braden J. Eliason, Minneapolis, MN (US); Benjamin J. Larsen, St. Paul, MN (US); David A. Melander, Saint Louis Park, MN (US); Rebecca E. Wereley, Richfield, MN (US)

(73) Assignee: Magnetic Mechanisms L.L.C., Shoreview, MN (US)

( * ) Notice: Subject to any disclaimer, the term of this patent is extended or adjusted under 35 U.S.C. 154(b) by 190 days.

(21) Appl. No.: 18/455,106

(22) Filed: Aug. 24, 2023

(65) Prior Publication Data

US 2024/0071669 A1 Feb. 29, 2024

Related U.S. Application Data

(60) Provisional application No. 63/400,968, filed on Aug. 25, 2022.

(51) Int. Cl.
*H01F 7/02* (2006.01)

(52) U.S. Cl.
CPC .................................. *H01F 7/0252* (2013.01)

(58) Field of Classification Search
CPC ......... H01F 7/0205; H01F 7/04; H01F 7/0252
See application file for complete search history.

(56) References Cited

U.S. PATENT DOCUMENTS 3,014,751 A 12/1961 Smith
3,241,516 A 3/1966 Hopkins
(Continued)

FOREIGN PATENT DOCUMENTS

AU 753496 B2 6/2001
AU 2002325077 B2 3/2003
(Continued)

OTHER PUBLICATIONS

Supplementary European Search Report for Application No. EP 15 85 21 27, dated Aug. 16, 2018, 2 pages.
(Continued)

*Primary Examiner* — Mohamad A Musleh
(74) *Attorney, Agent, or Firm* — Christensen, Fonder, Dardi & Herbert PLLC; John P. Fonder

(57) ABSTRACT

A mounting device for attaching a device to an attachment object, including: a magnet portion on a magnet-retaining portion; a mount-attachment portion configured to attach to the attachment object, the mount-attachment portion including a ring-shaped cam defining a cam surface with a cam profile having a variable height; and a base portion defining a channel for receiving the ring-shaped cam and defining a central opening for receiving the magnet portion, the base portion rotatable relative to the mount-attachment portion and including a grip surface comprising a grip material. The magnet portion is received into the central opening of the base portion, the ring-shaped cam is received into the channel of the base portion, and a first end of the magnet-retaining portion is adjacent to the cam surface. Rotation of the base portion relative to the attachment portion causes an end of the magnet to move away from the grip surface.

20 Claims, 8 Drawing Sheets

(56) References Cited

U.S. PATENT DOCUMENTS 3,419,832 A 12/1968 Baermann
3,539,800 A 11/1970 Doring
4,200,852 A 4/1980 Aoki
6,076,790 A 6/2000 Richter
6,491,271 B1 12/2002 Adams
6,564,678 B1 5/2003 Wang
6,653,920 B1 11/2003 Chen
7,012,495 B2 3/2006 Underwood et al.
7,172,079 B1 2/2007 Shiao
7,207,091 B2 4/2007 Dunaye
7,746,205 B2 6/2010 Fullerton et al.
7,750,774 B2 7/2010 Fullerton et al.
7,750,777 B2 7/2010 Fullerton et al.
7,750,778 B2 7/2010 Fullerton et al.
7,750,780 B2 7/2010 Fullerton et al.
7,750,781 B2 7/2010 Fullerton et al.
7,755,462 B2 7/2010 Fullerton et al.
7,772,952 B2 8/2010 Fullerton et al.
7,800,471 B2 9/2010 Fullerton et al.
7,800,472 B2 9/2010 Fullerton et al.
7,800,473 B2 9/2010 Fullerton et al.
7,808,348 B2 10/2010 Fullerton et al.
7,808,349 B2 10/2010 Fullerton et al.
7,808,350 B2 10/2010 Fullerton et al.
7,834,728 B2 11/2010 Fullerton et al.
7,834,729 B2 11/2010 Fullerton et al.
7,839,247 B2 11/2010 Fullerton et al.
7,839,248 B2 11/2010 Fullerton et al.
7,843,294 B2 11/2010 Fullerton et al.
7,855,624 B2 12/2010 Fullerton et al.
7,868,721 B2 1/2011 Fullerton et al.
7,889,038 B2 2/2011 Fullerton et al.
7,982,568 B2 7/2011 Fullerton et al.
8,035,260 B2 10/2011 Fullerton et al.
8,098,122 B2 1/2012 Fullerton et al.
8,115,581 B2 2/2012 Fullerton et al.
8,174,347 B2 5/2012 Fullerton et al.
8,179,219 B2 5/2012 Fullerton et al.
8,279,031 B2 10/2012 Fullerton et al.
8,279,032 B1 10/2012 Fullerton et al.
8,314,671 B2 11/2012 Fullerton et al.
8,314,672 B2 11/2012 Fullerton et al.
8,350,663 B1 1/2013 Michael
8,354,909 B2 1/2013 Fullerton et al.
8,356,400 B2 1/2013 Fullerton et al.
8,368,495 B2 2/2013 Fullerton et al.
8,373,527 B2 2/2013 Fullerton et al.
8,461,952 B1 6/2013 Fullerton et al.
8,502,630 B2 8/2013 Richards et al.
8,570,129 B2 10/2013 Fullerton et al.
8,570,130 B1 10/2013 Fullerton et al.
8,576,036 B2 11/2013 Fullerton et al.
8,593,242 B2 11/2013 Fullerton et al.
8,643,454 B2 2/2014 Fullerton et al.
8,648,681 B2 2/2014 Roberts et al.
8,692,637 B2 4/2014 Richards et al.
8,698,583 B2 4/2014 Fullerton et al.
8,702,437 B2 4/2014 Fullerton et al.
8,704,626 B2 4/2014 Fullerton et al.
8,717,131 B2 5/2014 Fullerton et al.
8,760,250 B2 6/2014 Fullerton et al.
8,760,251 B2 6/2014 Roberts et al.
8,760,252 B2 6/2014 Fullerton et al.
8,779,877 B2 7/2014 Fullerton et al.
8,779,879 B2 7/2014 Roberts et al.
8,810,348 B2 8/2014 Fullerton et al.
8,816,805 B2 8/2014 Fullerton et al.
8,841,981 B2 9/2014 Fullerton et al.
8,844,121 B2 9/2014 Fullerton et al.
8,848,973 B2 9/2014 Fullerton et al.
8,857,044 B2 10/2014 Fullerton et al.
8,872,608 B2 10/2014 Fullerton et al.
8,878,639 B2 11/2014 Kocijan
8,917,154 B2 12/2014 Fullerton et al.
8,937,521 B2 1/2015 Fullerton et al.
8,947,185 B2 2/2015 Fullerton et al.
8,957,751 B2 2/2015 Fullerton et al.
8,963,380 B2 2/2015 Fullerton et al.
8,963,668 B2 2/2015 Fullerton et al.
9,082,539 B2 7/2015 Fullerton
9,093,207 B2 7/2015 Fullerton et al.
9,105,380 B2 8/2015 Roberts et al.
9,105,384 B2 8/2015 Fullerton et al.
9,111,672 B2 8/2015 Fullerton et al.
9,111,673 B2 8/2015 Fullerton et al.
9,202,615 B2 12/2015 Fullerton et al.
9,202,616 B2 12/2015 Fullerton et al.
9,219,403 B2 12/2015 Evans
9,245,677 B2 1/2016 Fullerton et al.
9,257,219 B2 2/2016 Fullerton et al.
9,269,482 B2 2/2016 Fullerton
9,275,783 B2 3/2016 Fullerton et al.
9,277,813 B2 3/2016 Nelson
9,298,281 B2 3/2016 Fullerton et al.
9,312,634 B2 4/2016 Fullerton et al.
9,365,049 B2 6/2016 Fullerton
9,367,783 B2 6/2016 Fullerton et al.
9,371,923 B2 6/2016 Fullerton et al.
9,404,776 B2 8/2016 Fullerton et al.
9,406,424 B2 8/2016 Fullerton et al.
9,412,506 B2 8/2016 Fullerton et al.
9,536,650 B2 1/2017 Fullerton
9,588,599 B2 3/2017 Fullerton et al.
9,689,527 B2 6/2017 Franklin
9,711,268 B2 7/2017 Fullerton et al.
9,920,783 B2 3/2018 Runge et al.
10,008,817 B2 6/2018 Fullerton et al.
10,173,292 B2 1/2019 Fullerton et al.
10,194,246 B2 1/2019 Morgan et al.
10,204,727 B2 2/2019 Fullerton et al.
10,736,273 B1 8/2020 Kacines
10,903,030 B2 1/2021 Morton et al.
10,906,606 B2 2/2021 Ball et al.
11,097,401 B2 8/2021 Morton et al.
D930,354 S 9/2021 Morton et al.
11,482,359 B2 10/2022 Eliason et al.
11,915,862 B2 2/2024 Eliason et al.
2004/0239460 A1* 12/2004 Kocijan .................... H01F 7/04
335/207
2005/0156085 A1 7/2005 Radovan
2005/0216125 A1 9/2005 Hutson et al.
2007/0041777 A1 2/2007 Dietz
2007/0107665 A1 5/2007 Enoch
2007/0194187 A1 8/2007 Amron
2009/0211533 A1 8/2009 Sprung
2011/0056437 A1 3/2011 Sprung
2013/0002382 A1 1/2013 Zhang
2013/0222091 A1 8/2013 Fullerton et al.
2013/0320686 A1 12/2013 Morton
2015/0357105 A1 12/2015 Taylor
2016/0289046 A1 10/2016 Norton et al.
2017/0053725 A1 2/2017 St. Onge
2018/0032104 A1 2/2018 Schatz et al.
2020/0081483 A1 3/2020 Laurent et al.
2020/0148303 A1 5/2020 Ball et al.
2020/0169126 A1 5/2020 Morton et al.
2021/0154881 A1 5/2021 Klein et al.
2021/0180642 A1 6/2021 Botkus et al.
2021/0265089 A1 8/2021 Eliason et al.
2021/0268615 A1 9/2021 Morton et al.
2021/0323634 A1 10/2021 Ball et al.
2022/0003355 A1 1/2022 Hsu
2022/0045594 A1 2/2022 Morton et al.
2022/0072698 A1 3/2022 Morton et al.
2022/0415552 A1 12/2022 Eliason et al.
2024/0071667 A1 2/2024 Eliason et al.
2024/0071668 A1 2/2024 Eliason et al.

FOREIGN PATENT DOCUMENTS

AU 2002325077 A1 * 6/2003
AU 2006294433 A1 3/2007
AU 2007224996 B2 9/2007
CN 102217026 10/2011

(56) References Cited

FOREIGN PATENT DOCUMENTS

| | | | |
|---|---|---|---|
| CN | 102369582 | | 3/2012 |
| CN | 102804291 | | 11/2012 |
| CN | 104287594 | A | 1/2015 |
| CN | 106055042 | A | 10/2016 |
| CN | 110901793 | | 3/2020 |
| DE | 10 2004 015 873 | A1 | 10/2005 |
| DE | 10 2010 003 952 | A1 | 10/2011 |
| DE | 20 2011 101 534 | U1 | 11/2011 |
| DE | 10 2012 223 976 | A1 | 6/2014 |
| DE | 20 2016 006 696 | U1 | 1/2017 |
| DE | 10 2016 225 750 | A1 | 6/2018 |
| DE | 10 2016 225 893 | A1 | 6/2018 |
| EP | 1 425 763 | B1 | 2/2017 |
| EP | 2 438 601 | B1 | 3/2017 |
| EP | 3 166 749 | B1 | 8/2021 |
| EP | 3746261 | A4 | 11/2021 |
| GB | 444786 | A | 3/1936 |
| JP | S61187525 | U | 11/1986 |
| JP | H09 92525 | A | 4/1997 |
| JP | 2003-052574 | A | 2/2003 |
| JP | 2006-321149 | A | 11/2006 |
| JP | 5559770 | | 9/2011 |
| JP | 2012-513997 | | 6/2012 |
| JP | 2012-530950 | | 12/2012 |
| JP | 5604715 | | 10/2015 |
| JP | 2018-510790 | | 4/2018 |
| KR | 10-2004-0065521 | A | 7/2004 |
| KR | 10-0839166 | B1 | 6/2008 |
| KR | 10-2008-0094328 | | 10/2008 |
| KR | 10-863560 | B1 | 10/2008 |
| KR | 10-2008-0098705 | | 11/2008 |
| KR | 10-1919096 | B1 | 11/2008 |
| KR | 10-1243599 | B1 | 3/2013 |
| KR | 10-1460840 | B1 | 11/2014 |
| KR | 10-2015-0005071 | | 1/2015 |
| KR | 10-2015-0053576 | | 5/2015 |
| KR | 10-1672986 | B1 | 11/2016 |
| KR | 10-1715922 | B1 | 3/2017 |
| KR | 10-2017-0096643 | | 8/2017 |
| KR | 10-2017-0126532 | | 11/2017 |
| KR | 10-2018-0037615 | | 4/2018 |
| KR | 10-1847297 | B1 | 5/2018 |
| KR | 10-2018-0060185 | | 6/2018 |
| KR | 10-2020-0017717 | | 2/2020 |
| KR | 10-2020-0095707 | A | 8/2020 |
| KR | 10-2200860 | B1 | 1/2021 |
| KR | 10-2200861 | B1 | 1/2021 |
| WO | WO 2005/012757 | A1 | 2/2005 |
| WO | WO 2009/000008 | A1 | 12/2008 |
| WO | WO 2009/000599 | A1 | 12/2008 |
| WO | WO 2009/140750 | A2 | 11/2009 |
| WO | WO 2010/020006 | A1 | 2/2010 |
| WO | WO 2010/135788 | A1 | 12/2010 |
| WO | WO 2018/008993 | A1 | 1/2018 |
| WO | WO 2018/227140 | A1 | 12/2018 |
| WO | WO 2019/165228 | A1 | 8/2019 |

OTHER PUBLICATIONS

Notification of Transmittal of the International Search Report and the Written Opinion of the International Searching Authority, or the Declaration for Application No. PCT/US2021/018587, dated Aug. 6, 2021, (21 pages).

Notification of Transmittal of the International Search Report and the Written Opinion of the International Searching Authority, or the Declaration for Application No. PCT/US2023/030934, dated Oct. 16, 2023, (6 pages).

Notification of Transmittal of the International Search Report and the Written Opinion of the International Searching Authority, or the Declaration for Application No. PCT/US2023/031051, dated Nov. 15, 2023, (8 pages).

Notification of Transmittal of the International Search Report and the Written Opinion of the International Searching Authority, or the Declaration for Application No. PCT/US2023/031059, dated Jan. 3, 2024, (10 pages).

Notification of Transmittal of the International Search Report and the Written Opinion of the International Searching Authority, or the Declaration for Application No. PCT/US2023/031049, dated Jan. 8, 2024, (16 pages).

Amazon.com, Site visited Sep. 17, 2025, MAGTSMEI Black Magnetic Hooks Heavy Duty, Date first available, Dec. 14, 2021, https://www.amazon.com/MAGTSMEI-Magnetic-Neodymium-Refrigerator-Industrial/dp/B09NM7B6QG/ref=ast_sto_dp_puis?th=1 (Year: 2021).

Amazon.com, Site visited Sep. 17, 2025, ENUODA Strong Magnetic Hooks Heavy Duty, Date first available, Feb. 26, 2024, https://www.amazon.com/ENUODA-Magnetic-Magnets-Utility-Extension/dp/B0CWGW4JLD?ref_=ast_sto_dp&th=1 (Year: 2024).

Amazon.com, Site visited Sep. 17, 2025, FINDMAG Magnetic Hooks, Date first available, Oct. 17, 2023, https://www.amazon.com/FINDMAG-Magnetic-Neodymium-Hanging-Refrigerator/dp/B0CC8WVB57?ref_=ast_sto_dp&th=1 (Year:2023).

Amazon.com, Site visited Sep. 17, 2025, Magnetic Hooks for Grill & Refrigerator, Date first available, Jul. 10, 2024, https://www.amazon.com/Magnetic-Refrigerator-4-Pack-Rubber-Coated/dp/BOD9644TKP/ref=sr_1_2?dib=eyJ2IjoiMSJ9.qUf5v3fcOsJLDCzHQ13YZxhEhD73EXURaOP7zDE4BYwpZ-NpH97x9W7RBGFWJIB7BfUtTwe4Q3b1JSOqESqBWLbskhxVi8vjMQrMn3kMhdAPB_0bp8dE9otH2pAPw6tDe04oh2FP0fA922B2smN_omcggG18dbKgu7y70Wg7ySE4OBVKVYGXsjRRAnR-5iIcNlydoh7j4OL3F9ufVFdDW4bZ1cF40x8atQJu-3HfLpaf5pTBX3jPjytvr09UhHvI.glqMaaB3VhbuA4qCI6cWr_WyYUiMiDAhCayNtpyd6ws&dib_tag-se&qid=1757689830&refinements=p_89%3AJINGZHAN&sr-8-2&srs=121075627011&th=1 (Year:2024).

* cited by examiner

| | | |
|---|---|---|
| Work Input (Nmm) | 12 | |
| | | |
| Work = Force x Distance | | |
| Distance (mm) | Force (N) | Work Completed (Nmm) |
| 6.26 | 75.11 | 12 |
| 3.87 | 46.39 | 12 |
| 2.49 | 29.85 | 12 |
| 1.43 | 17.18 | 12 |
| 0.76 | 9.13 | 12 |
| 0.42 | 5.06 | 12 |
| 0.24 | 2.84 | 12 |
| 0.13 | 1.61 | 12 |
| 0.08 | 0.92 | 12 |
| 0.05 | 0.55 | 12 |
| 0.03 | 0.33 | 12 |
| 0.02 | 0.21 | 12 |
| 0.01 | 0.14 | 12 |
| | | |
| Total Traveled Distance (mm) | 15.78 | |

DETACHABLE MAGNETIC MOUNTING SYSTEMS, DEVICES AND METHODS

CROSS-REFERENCE TO RELATED APPLICATIONS

This application claims the benefit of U.S. Provisional Patent Application No. 63/400,968, filed Aug. 25, 2022, which is incorporated herein in its entirety.

FIELD OF THE INVENTION

The invention relates generally to systems, devices and methods for magnetically attaching devices to an attachment object.

BACKGROUND

Devices for detachably connecting or attaching a device to an object are known. For example, clamping devices and adapters may be used to connect cameras, phones, GPS devices, to cars, motorcycles, persons, and so on. For such known devices, even when a particularly secure connection is made, attaching and detaching the device, such as a phone, is often difficult or cumbersome, with the degree of security being proportional to the degree of difficulty of use.

SUMMARY

Embodiments of the present invention address shortcomings of such connecting devices and are directed generally to magnet-based devices, systems and methods for detachably connecting devices, such as a phone, to an attachment object. In an embodiment, the present disclosure is directed to a phone mount system that uses the phone itself as a moment arm to decrease the force required to remove the phone from the mount, as will be explained further below.

In an embodiment, the phone mount system includes a ferromagnetic backer plate that is attracted to the magnet of the system. The interfacing body that carries the load path has a high coefficient of friction material to maximize shear force. To release the phone from the mount, the user twists the phone until sufficient force decreases to de-couple the phone from the mounting device. The release mechanism may include a two-stage release such as push and then twist. The mounting device may include a return spring such that the mount always returns to the max attach mode. The system may include the ability to tune the attachment configuration or position to lighter or stronger holding rates. The phone, with a relatively large size, acts as a moment arm to decrease the force required to decouple the phone from the mounting device.

BRIEF DESCRIPTION OF THE DRAWINGS

The invention can be understood in consideration of the following detailed description of various embodiments of the invention in connection with the accompanying drawings, in which.

The drawings included in the present patent application are incorporated into, and form part of, the specification. They illustrate embodiments of the present disclosure and, along with the description, serve to explain the principles of the disclosure. The drawings are only illustrative of certain embodiments and do not limit the disclosure.

DETAILED DESCRIPTION

Figure 2:
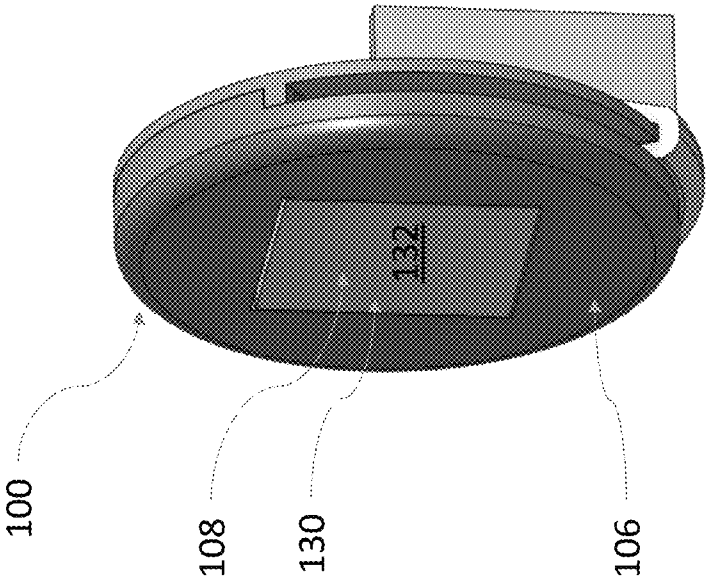
FIG. 2 is a rear perspective view schematic illustration of the mounting device and system of FIG. 1, according to an embodiment of the disclosure.
Figure 1:
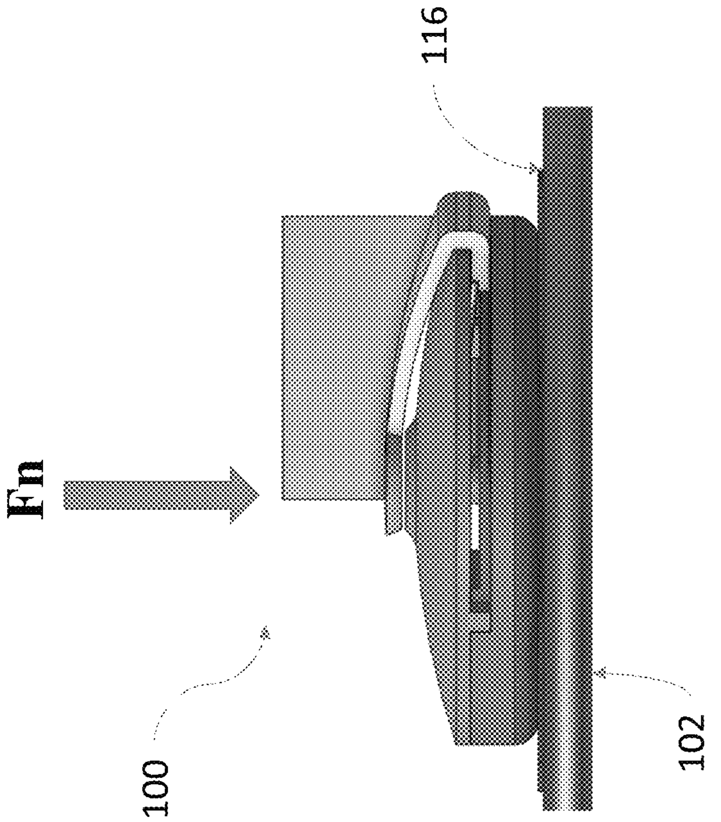
FIG. 1 is a side view schematic illustration of a mounting device and system, according to an embodiment of the disclosure.

Referring to FIGS. 1-2, an embodiment of mounting device and system 100 for a device 102 is depicted. In this embodiment, device 102 may comprise any number of devices, such as a phone, smart phone, camera, GPS device, and so on. Mounting device 100 is attached to a device 102, and may be used to attach or "mount" device 102 to another device or object not depicted, an "attachment" object. Attachment objects may include movable objects such as an automobile, motorcycle, recreational vehicle, a body-worn object, such as a helmet, and so on. In other embodiments, the attachment object may generally be immovable, for example, a portion of a building, such as a wall, a pole, fence, or similar.

As explained further below, mounting device 100 is an intermediate system or device for connecting device 102 to an attachment object. In an embodiment, mounting device 100 may be entirely, or at least partially, quickly and conveniently detachable from device 102. Mounting device 100 may also be conveniently and quickly detachable from an attachment object, though in other embodiments, mounting device 100 may be affixed to the target attachment object in a more permanent, or less readily detachable manner. For example, mounting device 100 may be intended to stay connected to the attachment object, while device 102 is readily and in some cases often, detached from the attachment object. In such embodiments, all or portions of mounting device 100 may be held to the attachment object with fasteners, adhesive, and so on, while device 102 is readily attachable and detachable from the mounting device 100. For example, portions of mounting device 100 may be connected to motorcycle handlebars (attachment object) with hardware such as clamps and fasteners (not quickly detachable), while device 102, such as a phone, is readily detachable from mounting device 100.

Embodiments of the present disclosure are depicted and described in Appendix 1: Detachable Magnetic Device and in Appendix 2: Phone Mount System, both of which are part of the present disclosure, and which are incorporated herein in its entirety.

FIG. 1 is a side view of mounting device 100 connected to the back of device 102, which in this embodiment, is a smart phone. FIG. 2 is a rear perspective view of mounting device 100 detached from the attachment object.

Figure 3:
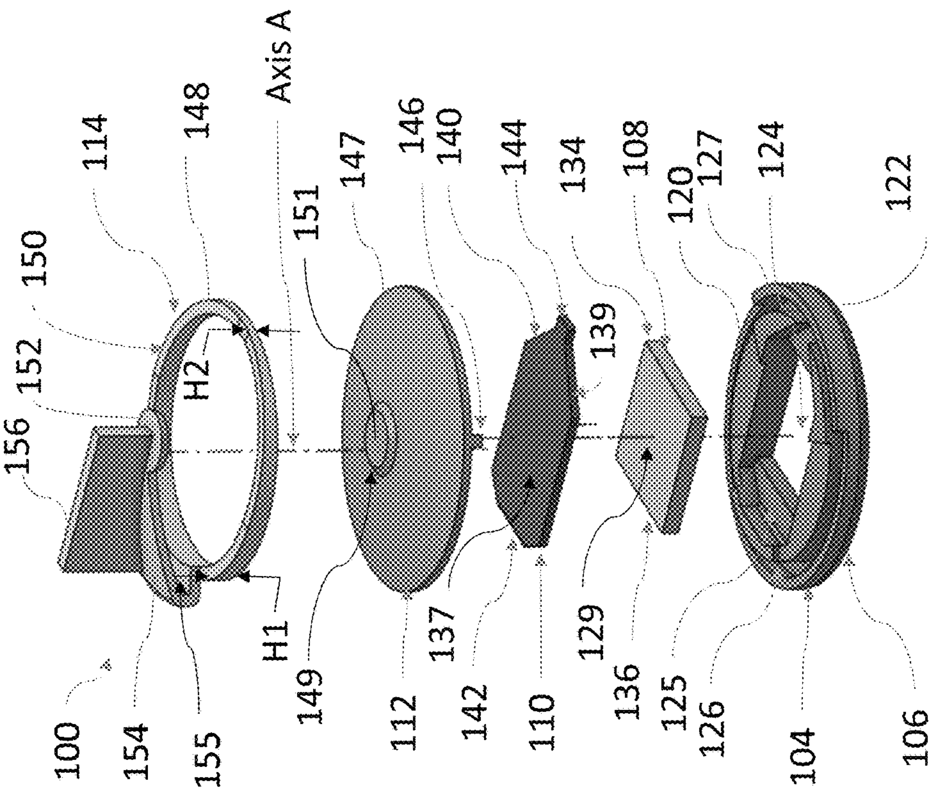
FIG. 3 is an exploded view of the mounting device of FIG. 1, according to an embodiment of the disclosure.

FIG. 3 is an exploded view of mounting device 100. In an embodiment, and as depicted, mounting device 100 includes articulating base or base portion 104 (also referred to as a body or chassis) with grip material 106, magnetic device or portion 108, magnet-retaining portion 110 (also referred to as a shunt plate), cap or cover 112, and mount-attachment portion 114. Mounting device 100 may also include ferromagnetic plate 116, which may be secured to device 102, as explained further below. Mounting device 100 with ferromagnetic plate 116 may also be referred to as a mounting system.

In an embodiment, articulating base 104 includes first or front side 120, second or rear side 122, and defines central opening 124. Front side 120 defines circular channel 126 configured to receive portions of mount-attachment portion 114. Central opening 124 is configured to receive magnetic device 108.

In an embodiment, articulating base 104 also defines recess 125 configured to receive magnet-retaining portion 110. In an embodiment, recess 125 is shaped complementary, i.e., having essentially the same shape as, magnet-retaining portion 110.

In an embodiment, articulating base 104 also includes ridge 127 configured to abut cap 112, and to engage with stop tabs 146, thereby limiting rotation of cap 112 relative to base 104.

Grip material 106 may be an overmold onto rear side 122 of articulating base 104, or may otherwise be affixed to rear side 122. Grip material 106 defines grip surface 128 that contacts device 102 and/or ferromagnetic plate 116. Grip material 106, in an embodiment, has a high static coefficient of friction, and may also have a low hardness.

In an embodiment, grip material 106 thermoplastic elastomer ("TPE") materials, thermoplastic polyurethane ("TPU") materials, GM631 gripping material as manufactured by 3M® of St. Paul, MN, vinyl stickers, rubber, rubber coatings such as Plasti Dip °, and similar. The use of such high-coefficient-of-friction materials for grip material 106 maximizes the amount of applied force required to move device 100 along a surface. In an embodiment, grip material 106 is selected to accommodate a texture of a ferrous or ferromagnetic object or surface to which device 300 is to be attached. In an embodiment, grip material has a Shore A durometer hardness in a range of 10 A to 90 A. Further, grip material 106 may be selected based on a coefficient of friction in combination with a particular ferromagnetic object or surface. For example, if the attachment object already has a high coefficient of friction, a higher hardness material for grip material 106 may be selected.

In an embodiment that improves prediction and control of compression of grip portion 106, grip material 106 is a relatively thin, high coefficient-of-friction material with a high spring constant so that changes in normal force result in only small changes in gap G dimensions.

In an embodiment, magnetic device 108 is a magnet assembly, and may comprise, though not be limited to, any of the magnetic assemblies of devices described herein. Embodiments of magnetic device 108 are generally configured to concentrate magnetic flux close to an outer surface of the magnetic device 108, and hence an attachment surface, to maximize frictional holding force, as explained further below.

In an such embodiment, magnetic device 108 includes a magnet portion, which may comprise a magnetic sheet with a plurality of "island portions" or individual magnetic regions with alternating north and south magnetic poles, as well as "interstitial portions, and, which may include a baseplate, which may comprise a conductive material, and magnetic sheet. In an embodiment, magnetic device 108 also includes front side with a first or front surface 129, and rear side 130 with second or rear surface 132. Magnetic device 108 also includes first end 134 and second end 136.

In an embodiment, magnetic device 108 may include multiple magnetic regions or island portions, each having their individual north pole and south pole, as described above. In an embodiment the distribution of the multiple magnetic regions may be non-uniform. In an embodiment, in magnetic device 108, a density of magnetic regions is greater, i.e., more regions per area, near a first end 134 of magnetic device 108, and lesser near a second end 136 of magnetic device 108. As such, second end 136 of magnetic device 308 will create a stronger magnetic field, and produce a greater normal force Fn (see also FIG. 1), as compared to first end 134. One advantage to such a configuration is that first end 134 will produce a weaker normal force at an attachment surface, as compared to second end 136, thusly making it easier to lift or lever first end 134 away from ferromagnetic plate 106, i.e., requires less opposing force to detach.

In another embodiment, magnetic device 108 comprises a channel magnetic device, or channel magnet.

In another embodiment, magnetic device 108 may include strips of magnetic material alternating with strips of steel spacers. In one such embodiment, magnetic device 108 includes a plurality of 0.125" wide×0.125" high×2" long magnets with 0.0625" wide×0.125" high×2" long steel strips between each pair of the plurality of long, slender magnets.

Magnet-retaining portion 110 may comprise a metal material, which may be a ferrous or ferromagnetic material. Magnet-retaining portion 110 is configured to support magnetic device 108, and is coupled to magnetic device 108, such as by adhesive or other means. In an embodiment, magnet-retaining portion 110 may be a relatively flat plate-like structure, and may include first, front or top surface 137, rear or bottom surface 139, first end 140 and second end 142. First end 140 may be angled and form a tab 144.

Cap 112, in an embodiment may form a domed circular shape, as depicted, and may include a pair of opposing stop tabs 146 to be received into base 104 for attachment to base 104. In an embodiment, stop tabs 146 extend from a peripheral portion, such as outside edge 147, of cap 112.

Cap 112 may also include raised central portion 149 configured to contact a portion of mount-attachment portion 114, which may be central support portion 152, as explained further below. In an embodiment, raised central portion 149 may be generally circular. In an embodiment, raised central portion 149 forms contact surface 151 for contacting a portion of mount attachment portion 114. Contact surface 151 may be generally flat. In another embodiment, contact surface 151 may form a concave surface configured to receive all or a portion of central support portion 152 of cap 112. In an embodiment, Axis A extends through a center of cap 112, and through raised central portion 149.

Figure 6:
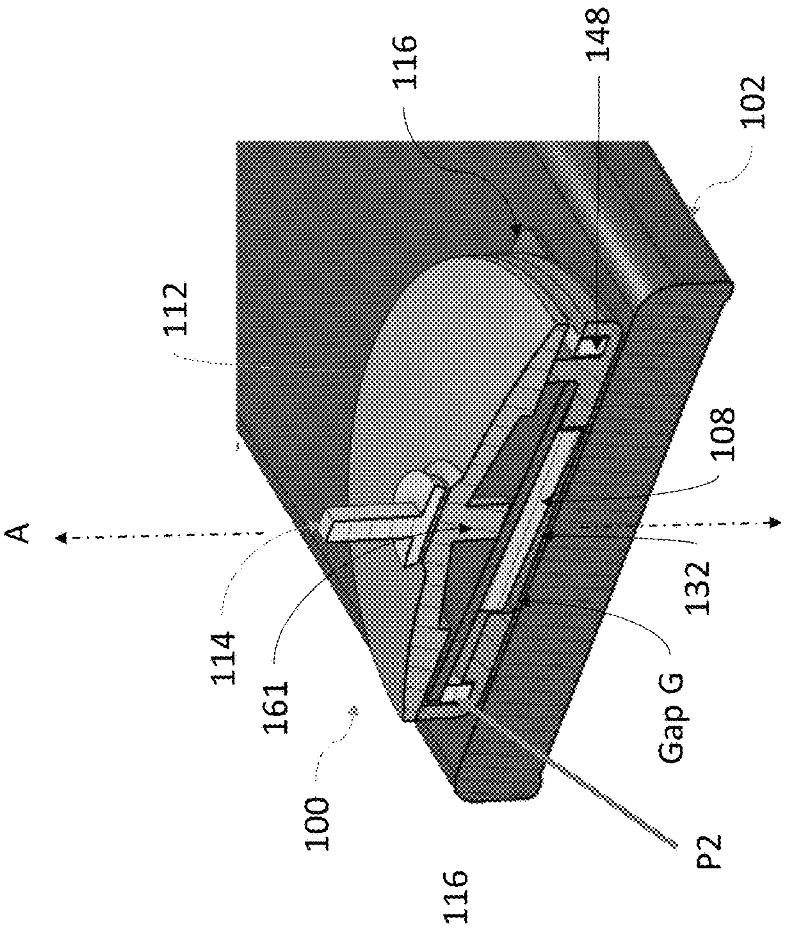
FIG. 6 is a sectional view of the mounting device of FIG. 1 coupled to a device, in a release configuration, according to an embodiment of the disclosure.
Figure 5:
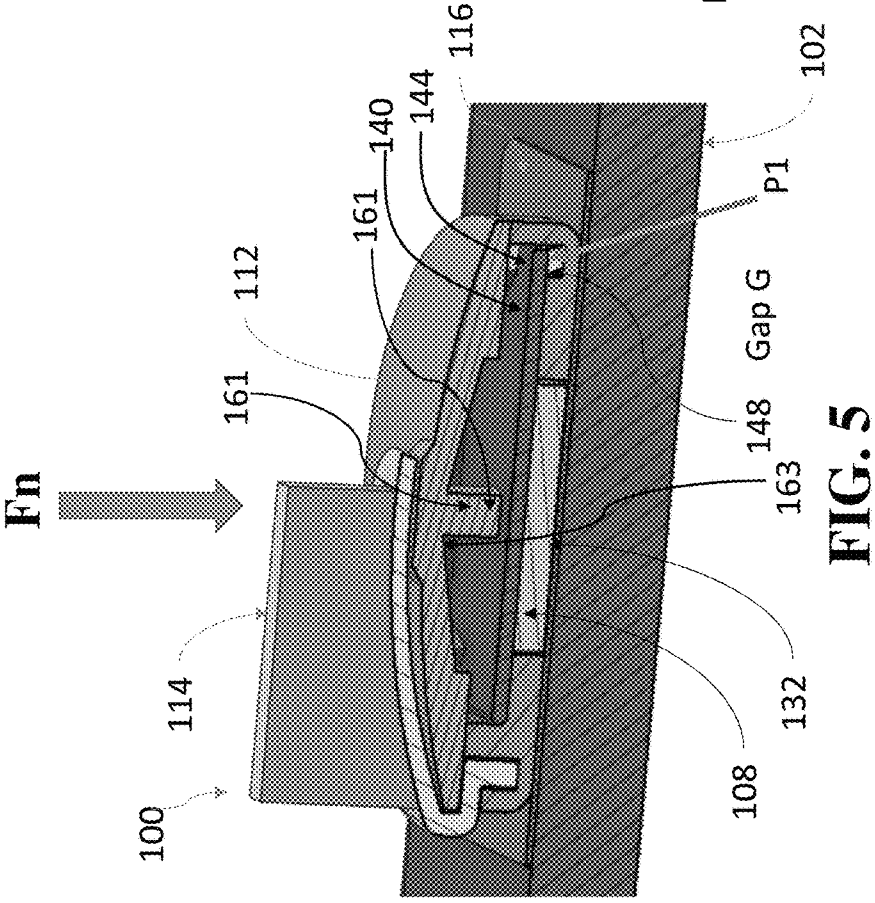
FIG. 5 is a sectional view of the mounting device of FIG. 1 coupled to a device, in an attachment configuration, according to an embodiment of the disclosure.

Referring also to FIGS. 5 and 6, cap portion 112, in an embodiment, includes central projection 161 which projects downward and away from a central, inside surface 163 of cap 112. In an embodiment, and as depicted in FIGS. 5 and 6, an end 165 of central projection 161 abuts top surface 137 of magnet retaining portion 110 to prevent movement of magnet-retaining portion 110 from moving in an rear to front (upward as depicted) direction, or in a direction opposite to force Fn.

Although depicted in this embodiment as a cap or cover 112 that covers an entirety of ring 148 and base 104, cover 112 may, in other embodiments, only cover a portion of the components of device 100, and may form shapes other than a disk. Most generally, cap or cover 112 may also be referred to as a an upper ring-retaining portion 112.

Mount-attachment portion 114 includes ring-like or ring-shaped portion 148, which may be an annular ring or partial ring, with top surface 150 forming a cam profile such that ring-like portion 148 functions as a cam (as explained further below), central support portion 152, and cover or upper portion 154, and attachment portion 156 for attaching to an attachment object. Ring 148 has a varying front-to-rear ring height so as to form the cam profile that includes top surface 150. Rear or first ring height H1 may be greater than ring height H2. In an embodiment, height H1 is measured at a position of ring 148 that has a maximum height, and height H2 is determined at a position of ring 148 that has a minimum height. In an embodiment, a ratio of height H1 to H2 may be in a range of 1.5 to 4; in an embodiment, a ratio of height H1 to H2 may be in a range of 2 to 4. The varying heights, thicknesses, of annular ring 148 forms a variable-height cam profile. In an embodiment, ring 148 forms a complete ring extending circumferentially 360°. In other embodiments, ring 148 may extend less than 360°, and may form a partial ring, such as a partial ring forming a C-shape that extends in a range of 90° to 270°. The circumferential length or arc length of ring 148 may vary in combination with the vertical cam profile to influence movement or travel of magnet 108 and magnet-retaining device 110.

In an embodiment, cover or upper portion 154 defines cap-receiving slot 155 configured to receive a portion of cap 112. Upper portion 154, in an embodiment extends circumferentially about a portion of ring 148, and may form a curved structure covering a portion of ring 148 and a portion of cap 112 when cap 112 is inserted in cap-receiving slot 155.

Attachment portion 156 is connected to upper portion 154, extending outward and away from upper portion 154. Attachment portion 156 is depicted in this embodiment as a plate-like structure, though in other embodiments, attachment portions 156 may form other shapes or structures adapted for connection to an attachment object. For example, in the depicted embodiment, attachment portion 156 may be received into a slot or clamp of an attachment object, such as a portion of a vehicle, helmet, etc.

Referring to FIGS. 1-2 and 5, when assembled, front surface 129 of magnetic device 108 is attached to magnet-retaining portion 110 at rear surface 139, so that magnetic device 108 is affixed or coupled to magnet-retaining portion 110. Magnet-retaining portion 110 and magnetic device 108 are received into base 104, with at least a portion of magnetic device 108 received into opening 124. Magnet-retaining portion 110 with magnet 108 is fit into base 104 such that rotation about a central axis A relative to base 104 is not possible, nor is lateral motion in general. However, portions of magnet retaining portion 110 with magnetic device are able to pivot in a rear-to-front or front-to-rear direction. More specifically, and as described further below, end 140 with tab 144 may be lifted so as to pivot magnet-retaining portion 110 and magnet 108 around stationary end 142 when device 102 and base 104 is rotated relative to mount-attachment portion 114.

Cap 112 is connected to base 104, with tabs 146 received into recesses in base 104. In some embodiments, cap 112 forms a snap fit joint with base 104. In an embodiment, cap 112 is fixed in position relative to base 104.

Mount-attachment portion 114 is rotatably coupled to base 104 about central axis A. Ring portion 148 is received into channel 126 of base 106.

Figure 7:
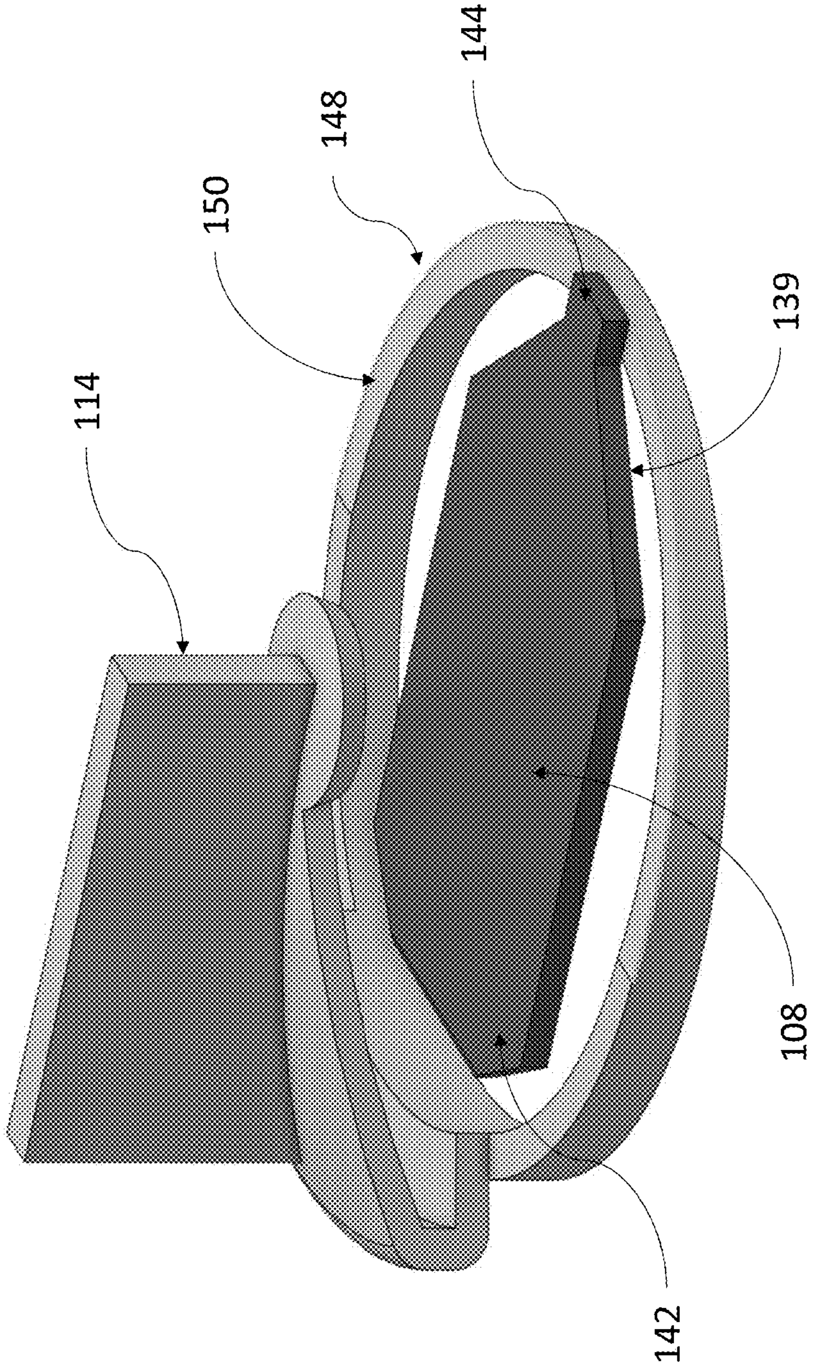
FIG. 7 is a perspective view of a mount-attachment portion with magnet-retaining portion, according to an embodiment of the disclosure.

Referring also to FIG. 7, end 140 or tab 144 with rear surface 139 of magnet-retaining portion 106 contacts top surface 150 of ring 148 of mount-attachment portion 114.

Figure 4:
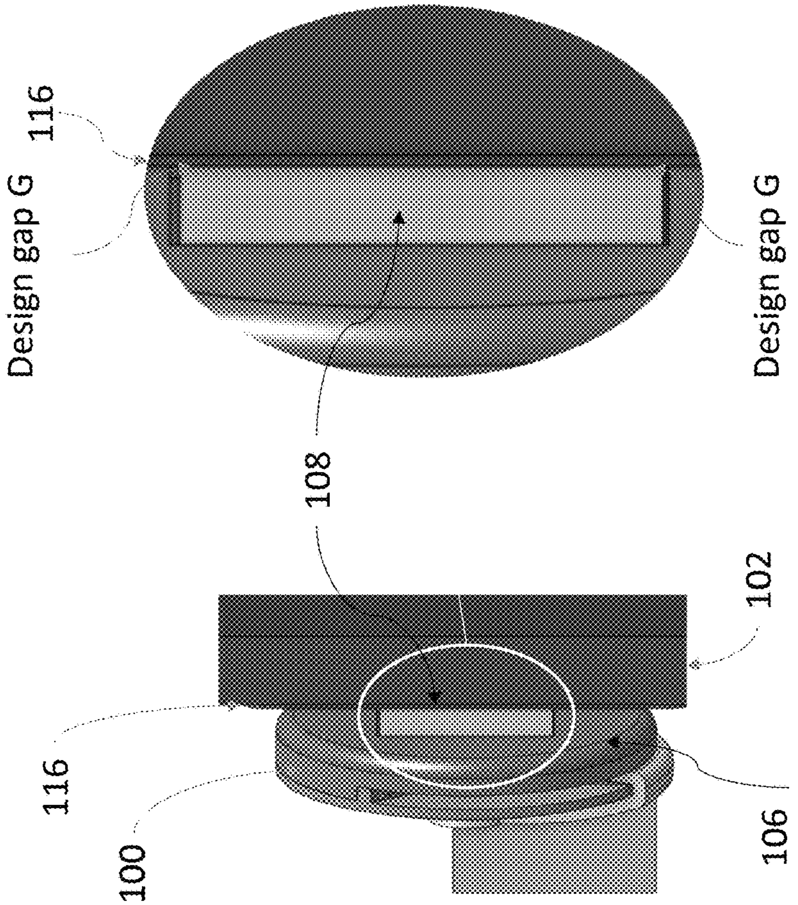
FIG. 4 is a perspective view of the mounting device of FIG. 1 coupled to a device, according to an embodiment of the disclosure.

Referring to FIGS. 4-5, mount system 100 is depicted in an attachment configuration to a device 102. In an embodiment, mount-attachment portion 114 is rotatable relative to base 104, and in this embodiment is rotated relative to base 104 as depicted to be in an attachment configuration. Ferromagnetic plate 116 is affixed to device 102, such as the phone depicted, and mounting device 100 is detachably coupled to device 102. In an embodiment, ferromagnetic plate 116 may be affixed or coupled to device 102 via an adhesive, by mechanical connection, or by other means. In an embodiment, device 102 includes a ferromagnetic plate 116 built into the device 102.

In an embodiment of the attachment configuration, magnet 108 and its rear surface 132 are adjacent to a surface of ferromagnetic plate 116, but not in actual contact with ferromagnetic plate 116. In an embodiment, rear surface 132 is generally parallel with a surface of ferromagnetic plate 116.

Gap G is formed between rear surface 132 and ferromagnetic plate 116. In the attachment configuration as depicted, gap G is generally uniform across the entire surface 132 of magnet 108. Having a very small gap G between magnet 108 and ferromagnetic plate 116 maximizes a normal force Fn exerted by mount system 100 onto ferromagnetic plate 116 and device 102, as explained further below. In an embodiment, in the attachment configuration, gap G is in a range of $0<G<0.3$ mm. In another embodiment, gap G is in a range of $0<G<1.0$ mm. Design selection of gap G depends on a number of factors, including desired normal force, and durometer of grip portion 106.

Figure 10:
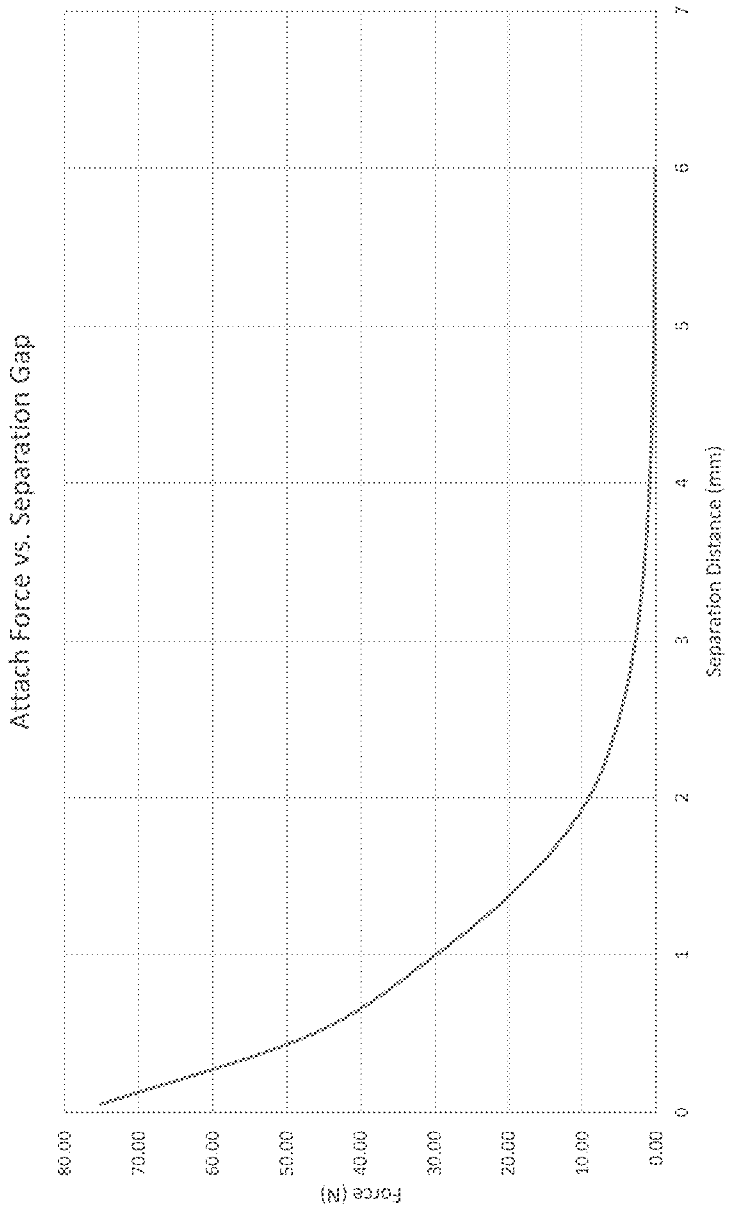
FIG. 10 is a graph of attachment force vs. separation gap, according to an embodiment of the disclosure.

Referring also to FIG. 10, a graph of normal force Fn for an embodiment of magnetic device 108 of mount system 100 vs. gap G is depicted. As indicated in the graph of FIG. 10, as a separation distance (gap G) is decreased, attachment force or normal force Fn increases.

In the attachment configuration, although magnetic device 108 is not in direct contact with ferromagnetic plate 116, grip portion 106 is directly in contact with ferromagnetic plate 116 and/or device 102. As described above, grip portion 106, in an embodiment has a relatively high coefficient of friction to prevent movement of device 102 relative to mount system 100 due to shear or frictional forces that are normal to normal force Fn exerted by magnetic device 108. Grip portion 106 may also comprise a relatively low hardness, i.e., low durometer, material so as to allow compression of grip portion 106 when normal force Fn is applied in the attachment configuration.

The attachment can also be adjusted by pattern variation, permanent magnet material grade and volume, adding a channel design to the magnet-retaining portion/shunt plate or using an assembled set of discrete magnets 108 and metal alloys. Those skilled in the art understand how to manipulate the flux to concentrate it into a target object, such as ferromagnetic plate 116, which in an embodiment comprises steel.

Figure 9A:
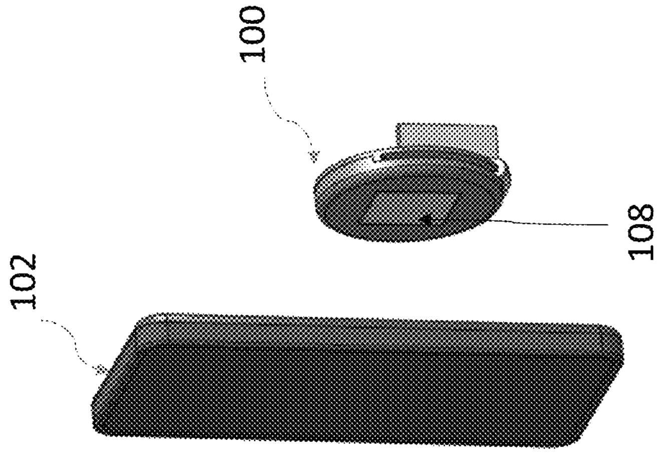
FIGS. 9A-9C are perspective views of the mount system of FIG. 1 connecting to a device that is a smart phone, according to an embodiment of the disclosure.
Figure 9B:
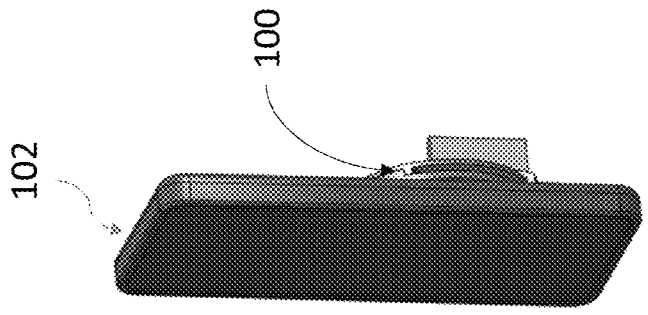
Figure 9C:
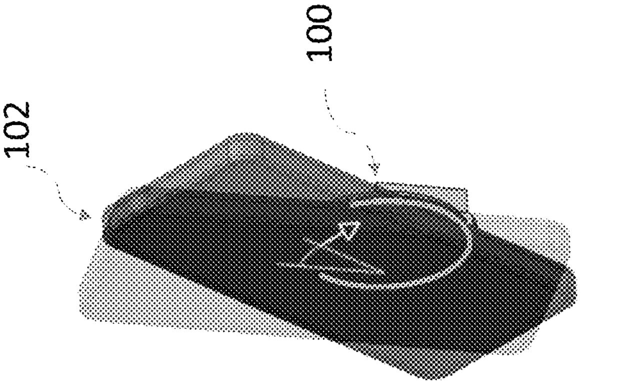

Referring to FIGS. 9A-9C, an overview of an attaching process and detaching process is depicted. In FIG. 9A, device 102, which in this embodiment is a phone, with ferromagnetic plate 116 (not shown), is moved toward the rear side of base 104 and magnetic-device 108 of mounting device 100. FIG. 9B depicts mounting device 100 attached to device 102 (attachment configuration). FIG. 9C depicts device 102 being rotated about mount device 100 so as to detach device 102 from mount device 100. The process of releasing device 102, or phone, from mounting device 100 is depicted as requiring a rotation or twist action for release. However, in another embodiment, there may also be a preliminary action that must take place prior to twisting such as, but not limited to, a push and then twist to release. Also it will be understood that although not depicted in FIGS. 9A-9C, mounting device 100 may be connected, coupled or attached via mount-attachment portion 114 to an attachment object so as to attach device 102 to the attachment object via mounting device 100.

Referring to FIGS. 5 and 6, mounting device 100 is depicted in cross section in the attachment configuration and a release configuration, respectively. In FIG. 5, magnet 108 is positioned a distance equal to a size of gap G from ferromagnetic plate 116, as also described above. The end 140 at tab 144 of magnet-retaining device 110 is contacting ring 148 at a point P1 where its cam profile is lowest, i.e., a front-to-rear height of ring 148 is at a minimum, which is height H2.

Figure 8:
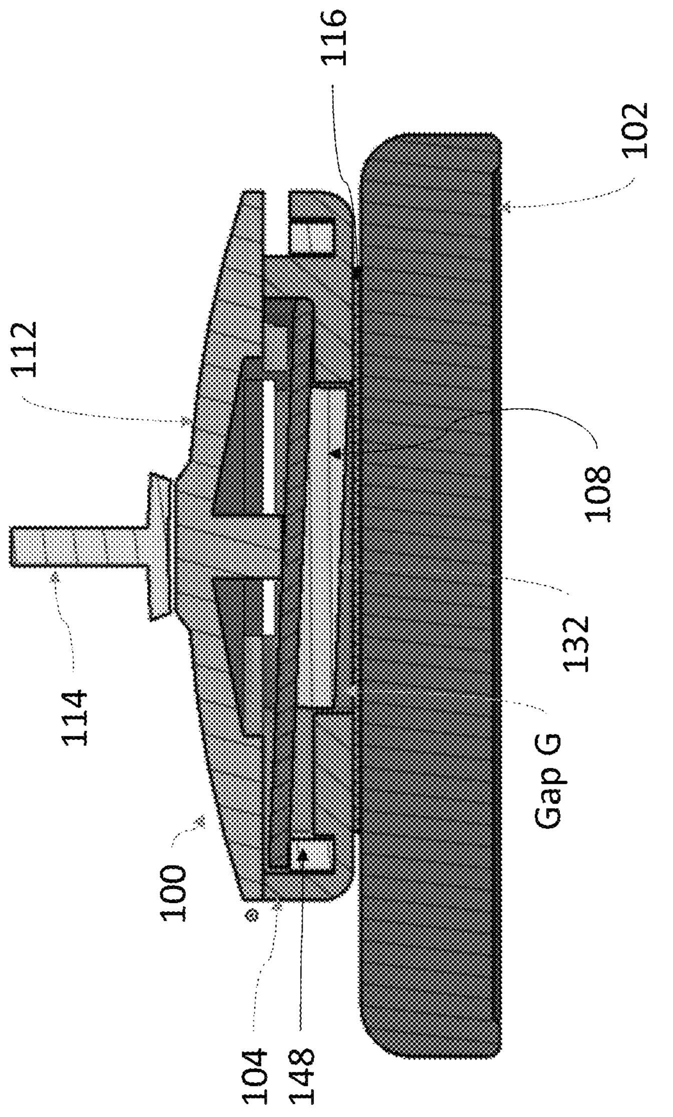
FIG. 8 is another sectional view of the mounting device of FIG. 1 coupled to a device, in a release configuration, according to an embodiment of the disclosure.

Referring to FIGS. 6 and 8, mount-attachment portion 114 is rotated relative to base 104 and device 102 to a detached position. In practice, mount-attachment portion 114 may actually be held stationary and mounted to an attachment object, and device 102 is used as a moment arm to rotate base 104, magnetic device 108, magnet-retaining portion 110, and cap 112 about mount-attachment portion 114 and central axis A. As mount-attachment portion 114 is rotated relative to base 104 and device 102, ring 148 is also rotated, lifting end 140 of magnetic device 108 due to a change in the cam profile. In other words, end 140 contacts ring 148 along the cam profile at a higher point, or where a height of ring 148 is greater. This lifting of end 140 of magnetic device 108 increases the gap G between rear surface 132 of magnetic device 108 and ferromagnetic plate 116, which significantly decreases the normal force Fn applied by magnetic device 108. As such, in this relative position, mount device 100 is in a release configuration.

Figure 11:
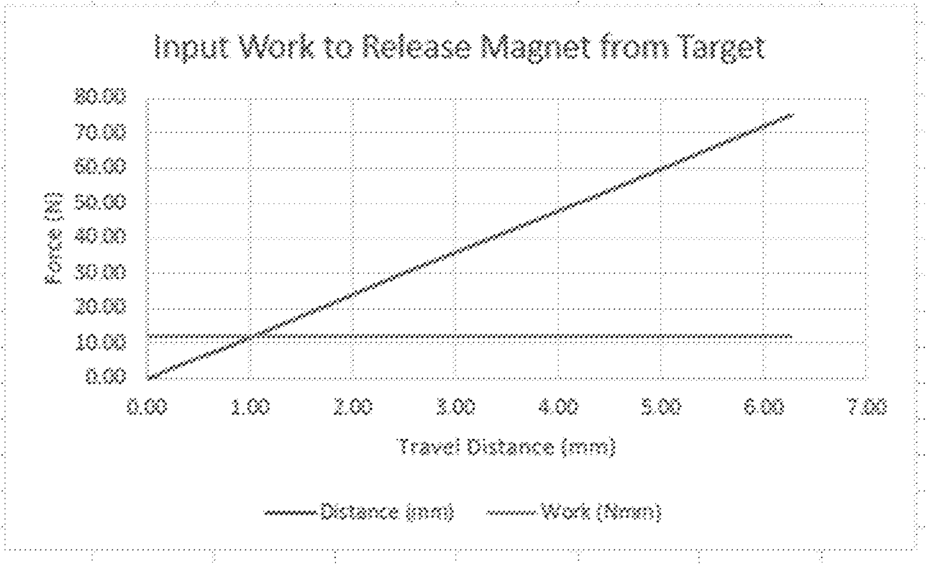
FIG. 11 is a table and graph describing a relationship between work, force and distance, according to an embodiment of the disclosure.

Referring to FIG. 11, a table and graph describing work, force and distance for various design gaps (travel distance) is depicted. Magnet force curve data plus input maximum input work can provide total required stroke plus an amount of stroke needed for each design gap G iteration which correlates to a required cam profile.

Embodiments of the present invention include the devices, systems and method steps described above, including methods of attaching and detaching a device to an attachment object using a mounting device described herein.

All of the features disclosed in this specification (including the appendices, and including any accompanying claims, abstract and drawings), and/or all of the steps of any method or process so disclosed, may be combined in any combination, except combinations where at least some of such features and/or steps are mutually exclusive.

Each feature disclosed in this specification (including incorporated appendices, any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A mounting device for attaching a device to an attachment object, comprising:

a magnetic portion having a magnet portion, a first surface, a first end and a second end;

a magnet-retaining portion having a first surface, a second surface and a first end, the magnet-retaining portion coupled to the magnetic portion such that the second surface of the magnet-retaining portion faces the first surface of the magnetic portion;

a mount-attachment portion including ring-shaped cam having a first height and a second height, the first height being greater than the second height, the ring-shaped cam including a cam surface defining a variable-height cam profile, the cam surface configured to engage the second surface of magnet-retaining portion at the first end of the magnet-retaining portion;

a base portion defining a magnet-receiving cavity for receiving the magnetic portion, defining a recess for receiving the magnet-retaining portion, and defining a circumferential channel for receiving the ring-shaped cam, the base portion including a grip surface comprising a grip material for contacting the attachment object; and a cap engaging the mount-attachment portion and the base portion and covering a portion of the ring-shaped cam;

wherein the base portion is rotatable relative to the mount-attachment portion about a central axis such that rotation of the base portion relative to the mount-attachment portion in a first direction causes the first end of the magnet-retaining portion to slide along the cam surface of the ring-shaped cam, causing the first end of the magnet-retaining portion and the first end of the attached magnet portion to move in a direction away from the base portion, thereby pivoting the magnet-retaining portion about the second end of the magnet-retaining portion and causing the mounting device to be in a configuration for detachment from the attachment object, and such that rotation of the base portion relative to the mount-attachment portion in a second direction causes the first end of the magnet-retaining portion to slide along the cam surface of the ring-shaped cam, causing the first end of the magnet-retaining portion and the first end of the attached magnet portion to move in a direction toward the base portion, thereby pivoting the magnet-retaining portion about the second end of the magnet-retaining portion and causing the mounting device to be in a position for attachment to the attachment object.

2. The mounting device of claim 1, wherein the ring-shaped cam is an annular ring extending 360°.

3. The mounting device of claim 1, wherein the ring-shaped cam is a partial ring extending circumferentially in a range of 90° to 270°.

4. The mounting device of claim 1, wherein the magnetic portion includes a second surface substantially parallel to the grip surface of the base when the mounting device is in the attached configuration.

5. The mounting device of claim 4, wherein the second surface of the magnetic portion is displaced along the central axis relative to the grip surface, such that when the mounting device is in the attached configuration, a separation gap between the second surface of the magnetic portion and the attachment object is present.

6. The mounting device of claim 5, wherein the separation gap is in a range of 0.1 mm to 1 mm.

7. The mounting device of claim 1, wherein the base portion includes a ridge and the cap includes a stop tab configured to engage the ridge and prevent rotation of the the base relative to the cap.

8. A mounting device for attaching a device to an attachment object, comprising:

a magnet portion;

a magnet-retaining portion attached to the magnet portion and having a first end and a second end;

a mount-attachment portion configured to attach to the attachment object, the mount-attachment portion including a ring-shaped cam defining a cam surface with a cam profile having a variable height; and a base portion defining a channel for receiving the ring-shaped cam and defining a central opening for receiving the magnet portion, the base portion rotatable relative to the mount-attachment portion and including a grip surface comprising a grip material;

wherein, the magnet portion is received into the central opening of the base portion, the ring-shaped cam is received into the channel of the base portion, and the first end of the magnet-retaining portion is adjacent to the cam surface; and wherein the base portion and the attachment portion are configured such that rotation of the base portion relative to the attachment portion, in a first direction, causes the first end of the magnet to move in a direction away from the grip surface.

9. The mounting device of claim 8, wherein the ring-shaped cam is a partial ring extending circumferentially in a range of 90° to 270°.

10. The mounting device of claim 8, further comprising a ferromagnetic plate with a first surface and a second surface, the first surface configured to attach to the device to be attached to the attachment object, and the second surface configured to attach to the magnet portion.

11. The mounting device of claim 8, wherein the magnetic portion includes a second surface substantially parallel to the grip surface of the base when the mounting device is in the attached configuration.

12. The mounting device of claim 11, wherein the second surface of the magnetic portion is displaced along the central axis relative to the grip surface, such that when the mounting device is in the attached configuration, a separation gap between the second surface of the magnetic portion and the attachment object is present.

13. The mounting device of claim 12, wherein the separation gap is in a range of 0.1 mm to 1 mm.

14. The mounting device of claim 8, wherein the base portion includes a ridge and the cap includes a stop tab configured to engage the ridge and prevent rotation of the base relative to the cap.

15. The mounting device of claim 8, wherein rotation of the base portion relative to the attachment portion in a second causes the first end of the magnet to move in a direction toward from the grip surface.

16. The mounting device of claim 8, further comprising a cap with a central projection, the cap in contact with the mount attachment portion, and the central projection portion in contact with the magnet retaining portion.

17. A system for attaching a device to an attachment object, comprising:

a ferromagnetic portion with a first surface and a second surface, the first surface configured to attach to the device to be attached to the attachment object;

an adhesive material for connecting the ferromagnetic plate to the attachment object;

a magnetic mounting device configured to magnetically attach to the ferromagnetic plate and to mechanically attach to the attachment object, the magnetic mounting device including:

a magnet portion;

a magnet-retaining portion attached to the magnet portion and having a first end and a second end;

a mount-attachment portion configured to attach to the attachment object, the mount-attachment portion including a cam in contact with the first end of the magnet-retaining portion;

a base portion defining a channel for receiving the cam and defining a central opening for receiving the magnet portion, the base portion rotatable relative to the mount-attachment portion and including a grip surface comprising a compressible grip material; and a cover portion covering a portion of the base portion;

wherein the base portion is rotatable with respect to the mount attachment portion in a plane transverse to a pivot direction of the magnet-retaining portion.

18. The system of claim 17, wherein the mount-attachment portion is configured to attach to the attachment object, the attachment objecting being a vehicle or a helmet.

19. The system of claim 17, wherein the ferromagnetic portion comprises a ferromagnetic plate configured to attach to a mobile phone.

20. The system of claim 17, wherein the cam forms a ring located in the channel of the base portion.

* * * * *